United States Patent [19]

Menut

[11] Patent Number: 5,483,226
[45] Date of Patent: Jan. 9, 1996

[54] ULTRASONIC DETECTOR, DETECTION METHOD FOR LIQUID MEDIA AND ULTRASONIC TRANSMITTER CONTROL METHOD

[76] Inventor: Jean-Baptiste Menut, 40 Avenue Henri Golay, CH 1219 Châtelaine, Geneva, Switzerland

[21] Appl. No.: 949,801

[22] PCT Filed: Apr. 8, 1992

[86] PCT No.: PCT/CH92/00065

§ 371 Date: Dec. 3, 1992

§ 102(e) Date: Dec. 3, 1992

[87] PCT Pub. No.: WO92/18835

PCT Pub. Date: Oct. 29, 1992

[30] Foreign Application Priority Data

Apr. 11, 1991 [CH] Switzerland .................. 1078/91

[51] Int. Cl.⁶ ..................................... G08B 21/00
[52] U.S. Cl. .................. 340/621; 367/908; 340/618; 73/290 V
[58] Field of Search ............. 367/908; 340/621; 73/290 V

[56] References Cited

U.S. PATENT DOCUMENTS 3,100,885  8/1963  Welkowitz et al. ............... 340/621
3,656,134  4/1972  Brown ............................... 340/621
4,540,981  9/1985  Lapetina et al. .................. 340/621
4,929,114  11/1981  Silvermetz et al. ............... 73/1 H
5,192,933  3/1993  Rodriguez ......................... 340/621

Primary Examiner—Richard E. Chilcot, Jr.
Assistant Examiner—Jewel V. Artis
Attorney, Agent, or Firm—Frost & Jacobs

[57] ABSTRACT

The ultrasonic transmitter (E) is subjected to two different excitation modes, and is mounted on the support (2) which at the same constitutes a waveguide.

Excitation of the transmitter at its axial-resonance frequency transmits ultrasonic waves through the liquid to provide a detection signal. Its excitation at its radial-resonance frequency creates ultrasonic waves propagated along the support (2) to provide an operation-control signal.

The invention is applicable to the detection of various liquids in a broad range of conditions and is suitable for industrial applications, notably in safety and control systems.

10 Claims, 12 Drawing Sheets

ULTRASONIC DETECTOR, DETECTION METHOD FOR LIQUID MEDIA AND ULTRASONIC TRANSMITTER CONTROL METHOD

FIELD OF THE INVENTION

The present invention relates to an ultrasonic detector for liquid media comprising a plate-shaped- ultrasonic transmitter and a corresponding ultrasonic receiver mounted facing each other on a common support serving to attach them at a principal face thereof and to define a space providing a linear acoustic path extending from the transmitter through the liquid to be detected to the receiver, an exciting circuit comprising a frequency generator connected to the transmitter via an amplifier and a detecting circuit comprising a rectifier with a low-pass filter, which is connected to the receiver via an amplifier and to at least one comparator with an adjustable threshold.

BACKGROUND OF THE INVENTION

The state of the art relating to ultrasonic detectors operating by acoustic transmission through the liquid to be detected may be illustrated for example by the following patent documents:

Patent application GB 2 177 510 A

German patent application DE 31 49 909 A1

U.S. Pat. Nos. 4,958,518; 4,787,240; 4,535,628; 4,432,231; 4,063,457.

The ultrasonic detectors described in DE 31 49 909 A1, U.S. Pat. Nos. 4,787,240 and 4,063,457 notably comprise elastic elements which are inserted between the transducers and their support and thus constitute an acoustic insulation.

Another type of liquid detector may moreover be mentioned which operates by ultrasonic propagation within a solid detecting body arranged in contact with the liquid to be detected. Detectors of this type are described for example in the patent applications FR 2 617 965 A1; FR 2 628 527 A1 and EP 0 372 700 A1.

Known ultrasonic detectors such as those cited above nevertheless require a more or less complicated structure, generally do not ensure control of their operation and have important limitations with regard to their respective fields of application.

SUMMARY OF THE INVENTION

The object of the present invention is to provide a relatively simple liquid-detector which offers complete operational security and is suitable for an extensive field of applications, notably for the control of pumps, valves and/or alarms constituting a part of control or safety systems.

To this end, the invention provides an ultrasonic detector that contains an ultrasonic transmitter and an ultrasonic receiver that are both mounted upon a common support (i.e., a support that is common to both the transmitter and receiver) and that face each other at a space therebetween, thereby providing a linear acoustic path through a liquid that is to be detected. A transmitter circuit is provided that includes a frequency generator and amplifier that is connected to the transmitter; and a receiver circuit a provided that includes a rectifier with low-pass filter, an amplifier, and a comparator having an adjustable threshold. The invention ensures automatic control of the operating state of the detector in absence as well as in presence of the liquid to be detected.

The ultrasonic transmitter of the liquid detector according to the invention is subjected to two different excitation modes in order to ensure on one hand the detection in presence of liquid and on the other hand automatic control of the operating state of the detector, while the detecting circuit periodically delivers the control signal as well as the liquid-detection signal.

The frequency generator is arranged so that it generates on one hand the axial-resonance frequency permitting to produce ultrasonic waves transmitted through the liquid to be detected, and on the other hand the radial-resonance frequency permitting to produce ultrasonic waves transmitted through the common support.

The two excitation frequencies are preferably the fundamental axial and radial resonance frequencies of the transmitter used.

Periodic control of the operating state of the detector is ensured via the common support on which the ultrasonic transmitter and the receiver are mounted so as to ensure good mechanical and acoustic connection in order to constitute a waveguide able to ensure permanent control of operation of the whole detector.

Axial excitation of the transmitter moreover produces crosstalk in the common support but does not enable adequate control of the detector to be ensured.

Experience has shown that the radial excitation, in the plane of the transmitter, always enables a significant control signal to be obtained which corresponds to the working condition of the detector in absence as well as in presence of the liquid to be detected.

The detector according to the invention thus permits permanent control of its working condition by means of ultrasonic waves transmitted through the common support which is specially designed to ensure good acoustic coupling enabling any failure or malfunction to be instantly detected whatever the cause may be.

The control signal obtained in accordance with the invention advantageously permits adjustment of the liquid-detection threshold.

To this end, the detecting circuit may be provided with a switch controlled by a synchronizing signal produced by the frequency generator and connected to a potentiometer for adjustment of the detection threshold of the comparator so that the threshold may be adjusted as a function of the amplitude of the signal leaving the rectifier with a low-pass filter and corresponding to the radial-excitation frequency.

The transmitter and the receiver of the detector according to the invention consist of small piezoelectric plates of any appropriate circular, square or rectangular shape. Their dimensions will be selected in known manner notably according to the length of the acoustic path to be travelled through the liquid.

Depending on the nature of the liquid to be detected, the length of the acoustic path through the liquid may be chosen more or less freely in a broad range extending from a few millimeters to several tens of centimeters. The form and the dimensions of the support are then selected according to the size of the transmitter and the receiver, the length of the acoustic path through the liquid and the intended application.

Good results were obtained with detectors comprising piezoelectric transmitters and receivers in the form of thin disks with a diameter of 6 to 16 mm and a thickness of 0.5 to 3 mm.

A principal face of the transmitter and the receiver is advantageously bonded to the corresponding bearing surface in order to make it completely solid with the common support and to thus ensure the acoustic coupling which is indispensable to ensure the control function via this common support.

The bearing surfaces for mounting the transmitter and the receiver on their common support may be advantageously provided on very thin walls, of 0.5 mm thickness for example, which constitute an integral part of the common support and allow the detection and control signals to be improved, notably when the liquid to be detected more or less strongly absorbs the ultrasonic waves. These walls provide the bearing surfaces which preferably separate the transmitter and the receiver from the liquid to be detected, so as to protect them from any contact with this liquid.

Mounting the transmitter and the receiver on the thin wall of the support effectively allows wave propagation by reflection in the support to be practically suppressed and to thereby attenuate this crosstalk.

The radial component of oscillations, which is due to axial excitation, is moreover diminished by a judicious choice of the piezoelectric material of the transmitter.

According to a particularly advantageous embodiment of the invention, an ultrasonic detector is provided that contains a transducer means that comprises an ultrasonic wave transmitter and an ultrasonic wave receiver that are both mounted upon a common support (i.e., a support that is common to both the transmitter and receiver), and includes electronics that process signals applied to the transmitter and delivered to the receiver. The transducer means for transmitting and receiving ultrasonic waves respectively comprise small piezoelectric plates curved in the form of a cylinder segment comprising a concave face, and are symmetrically mounted on a pipe having corresponding wall segments of small thickness forming an integral part of said pipe and each comprising a convex bearing surface adapted to the concave face of the piezoelectric plate.

The centers of curvature of said curved piezoelectric plates coincide with the longitudinal axis of said pipe so that ultrasonic waves generated by excitation of the curved transmitting transducer at an axial-resonance frequency may form a beam converging towards the axis of said pipe and diverging towards said receiving transducer and that ultrasonic waves generated by excitation of the curved transmitting transducer at a radial-resonance frequency are transmitted by its concave active surface in direct contact with the convex bearing surface of the corresponding wall segment and propagated in the wall of said pipe.

Tests which were carried out within the framework of the present invention have shown that this particular combination of operation of the transmitter in the radial-resonance mode with the propagation of ultrasonic waves caused by said radial resonance make it possible to provide various advantageous embodiments, respectively adapted to different applications.

As will be seen further on, it is moreover in principle also possible within the framework of the invention to use a single piezoelectric transducer arranged on its support and associated with electronic means for processing the transmission and detection signals in a manner allowing it to operate alternately as a transmitter and a receiver.

When the electroacoustic transducer is provided to operate alternately as a transmitter and a receiver in the axial-resonance mode, it will be associated with any appropriate reflecting surface so that the ultrasonic waves transmitted through a liquid to be detected by this transducer operating as a transmitter are reflected towards this transducer operating next as a receiver.

The invention also provides a method of detecting liquid media by means of ultrasonic waves using a piezoelectric transducer mounted on a solid support having a surface for contact with the liquid media to be detected. The transducer is directly mounted on the solid support, which is arranged or configured so that it constitutes a waveguide to permit transmission of ultrasonic waves generated by the transducer. During one time interval, the transducer is operated in an axial-excitation mode corresponding to an axial-resonance frequency perpendicular to the principal faces of the transducer. During a second time interval, the transducer is operated in a radial-excitation mode corresponding to a radial-resonance frequency in the plane of the principal faces of the transducer. The ultrasonic waves are respectively intercepted, either in the liquid media to be detected or in the solid support, which allows the liquid media to be detected and control of the transducer.

The invention further provides a method of controlling the operation of an ultrasonic transmitter, having a small piezoelectric plate mounted on a solid support which is configured to transmit transversal ultrasonic waves through a liquid medium. The ultrasonic transmitter is operated in two different excitation modes, one corresponding to an axial-resonance frequency for transmitting the transversal ultrasonic waves through a liquid medium, a second corresponding to a radial-excitation frequency for transmitting waves along the solid support. The ultrasonic wave (or signal) propagated in the solid support is intercepted and compared to a reference signal that corresponds to the operation of the transmitter under predetermined initial conditions, and the difference between the actual ultrasonic wave signal and the reference signal is determined so as to detect any deviation of the operation of the transmitter with respect to the reference signal.

The invention will be explained in greater detail by means of various embodiments given by way of example and represented in the accompanying drawing in the following manner.

DETAILED DESCRIPTION OF THE INVENTION

Figure 1:
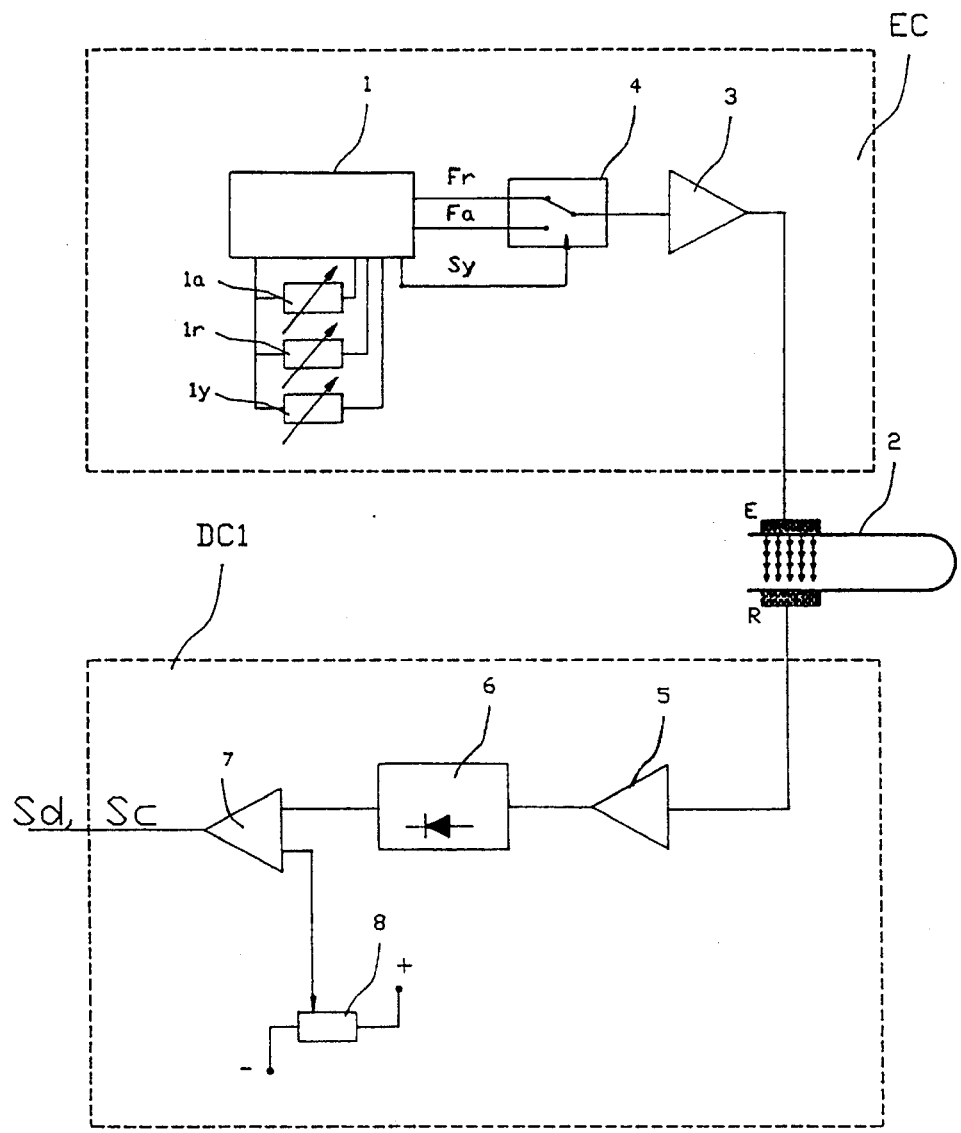
FIG. 1 is a schematic view of an ultrasonic detector associated with the exciting and detecting circuits according to one embodiment of the invention.

The detector according to FIG. 1 essentially comprises a transmitter E and a receiver R arranged facing each other on a common U-shaped support 2 and separated by a space defining a linear acoustic path through the liquid to be detected, indicated schematically by arrows in FIG. 1.

The transmitter E and the receiver R are respectively connected to the exciting circuit EC for the transmitter E and to the detecting circuit DC1 for processing the signals originating from the receiver R.

The transmitter E and the receiver R consist of small piezoelectric plates respectively mounted on two bearing surfaces 2e, 2r (FIG. 1a) disposed at the free ends of the two branches of the common support 2 which is formed in the present case of a steel band bent in U-form constituting a good acoustic conductor.

The common support 2 is rigid and thus fixes the exact position of the transmitter E and the receiver R and the length of the acoustic path through the liquid to be detected. It constitutes at the same time a waveguide which ensures a good mechanical and acoustic connection between the transmitter and the receiver and thus enables the transmission of elastic ultrasonic waves along a secondary acoustic path extending in the common support 2 from the transmitter to the receiver R.

The exciting circuit EC and the detecting circuit DC1 represented in FIG. 1 comprise on one hand a frequency generator 1 connected by an amplifier 3 to the transmitter E and on the other hand a rectifier with low-pass filter 6 connected to the receiver R by an amplifier 5 and to a comparator 7 provided with a variable threshold-adjusting resistor 8.

The frequency generator 1 of the exciting circuit EC is here provided with three variable resistors 1a, 1r, 1y to enable it to provide the following three periodic signals:

A synchronizing signal Sy corresponding to a switching frequency, the axial-excitation frequency Fa preferably corresponding to the fundamental axial-resonance frequency of the transmitter E, perpendicular to its principal faces (in order to produce the ultrasonic waves transmitted to the receiver R in presence of the liquid to be detected) and an radial-excitation signal Fr which preferably corresponds to the fundamental radial-resonance frequency of the transmitter E and serves to generate ultrasonic waves transmitted to the receiver R in the common support 2.

The exciting circuit EC is further provided with a switch 4 associated with a frequency generator 1 and controlled by the synchronizing signal Sy so that the fundamental axial-resonance frequency Fa and fundamental radial-resonance frequency Fr are alternately conducted to the transmitter E via the amplifier 3.

Good results were obtained with the detector according to the invention having a transmitter alternately excited for example at an axial frequency Fa of 700 kHz and a radial frequency Fr of 250 kHz.

The period of the synchronizing signal Sy is chosen so that it is at least 10 to 20 times longer than the radial-excitation period.

The detecting circuit DC1 alternately delivers to the output of the comparator 7 a detection signal Sd (in presence of the liquid to be detected) and a control signal Sc (transmitted through the support 2 in absence as well as in presence of the liquid to be detected), which corresponds to the working condition of the detector.

Figure 1A:
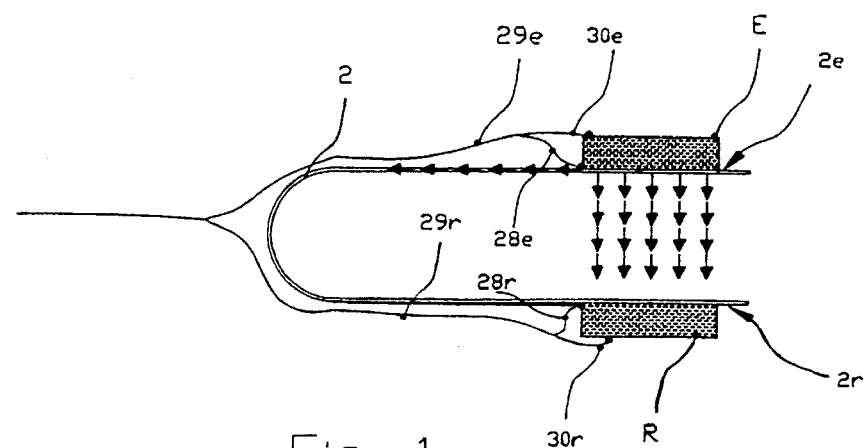
FIG. 1a shows the mounting arrangement of the transmitter and the receiver on the common support of the detector according to FIG. 1.

As appears more particularly from FIG. 1a, a principal face of each of the plates E and R is attached by means of a conductive adhesive to the corresponding bearing surface 2e and 2r at the end of one branch of the common support 2. Only the manner of mounting the transmitter E will be described here, which is exactly identical to that of the receiver R.

The inner principal face of the transmitter E is bonded here to the outer bearing surface 2e of the support 2 and electrically connected to the corresponding electrode of the transmitter by means of a layer of conductive adhesive connected to the shield 28e of a shielded coaxial wire 29e. The outer principal face of the plate E is coated with a conductive layer connected to a central electric wire 30e of the shielded wire 29e.

The receiver R is arranged, mounted and connected to the shielded wire 29r in identical fashion on the bearing surface 2r.

The transmitter E and the receiver R, together with their common support 2 and the electrical connections, are surrounded by a rigid sheath, not shown in FIG. 1, made for example of plastic material, serving to encapsulate, protect and reinforce the support 2 with the transmitter E, the receiver R and their connections.

Figure 2:
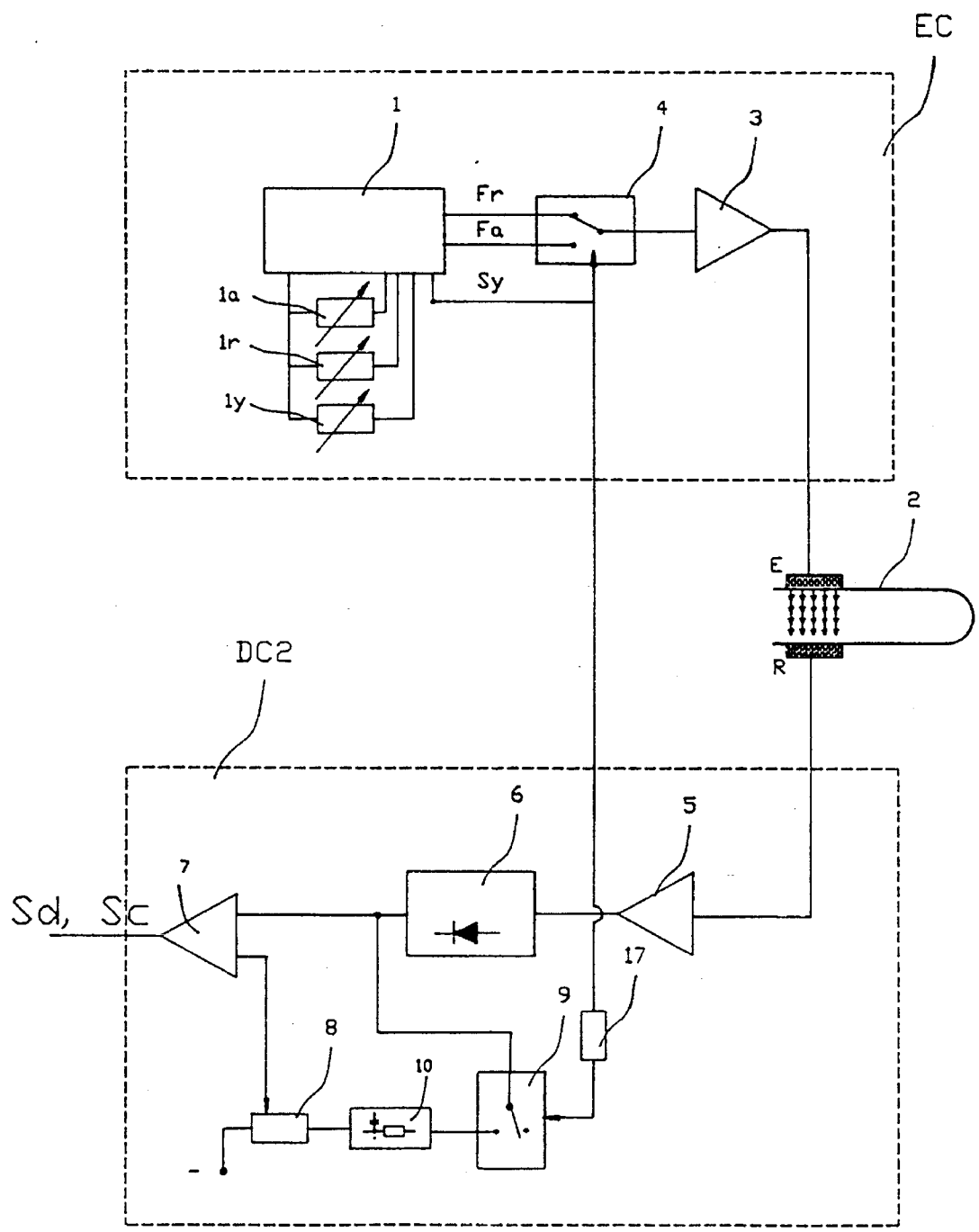
FIG. 2 shows a variant of the detecting circuit of the detector according to FIG. 1, comprising means for correcting the detection threshold.

FIG. 2 shows a variant which corresponds to the detector according to FIG. 1, except that the detecting circuit DC2 according to FIG. 2 comprises means for automatic correction of the detection threshold.

To this end, the detecting circuit DC2 shown in FIG. 2 is provided with a switch 9 connected to the output of the rectifier with low-pass filter 6 and, via another low-pass filter 10, to the potentiometer 8 for adjusting the detection threshold of the comparator 7.

As further appears from FIG. 2, this switch 9 is controlled by the synchronizing signal Sy (originating from the frequency generator 1), in such manner that the response signal transmitted through the support 2 during radial excitation of the transmitter E is conducted to the potentiometer 8 and that it thereby continually adjusts the detection threshold of the comparator 7 as a function of the amplitude of this signal. In order that the switch 9 may allow the signal which is transmitted through the support 2 to pass to the low-pass filter 10 during radial excitation, this switch 9 is control led by the synchronizing signal Sy with a delay provided by a retarder 17 corresponding to the time of propagation in the support 2.

Thus, when the response signals are weakened for any reason, the detection threshold of the comparator 6 will be lowered accordingly in order to ensure satisfactory detection.

Figure 3:
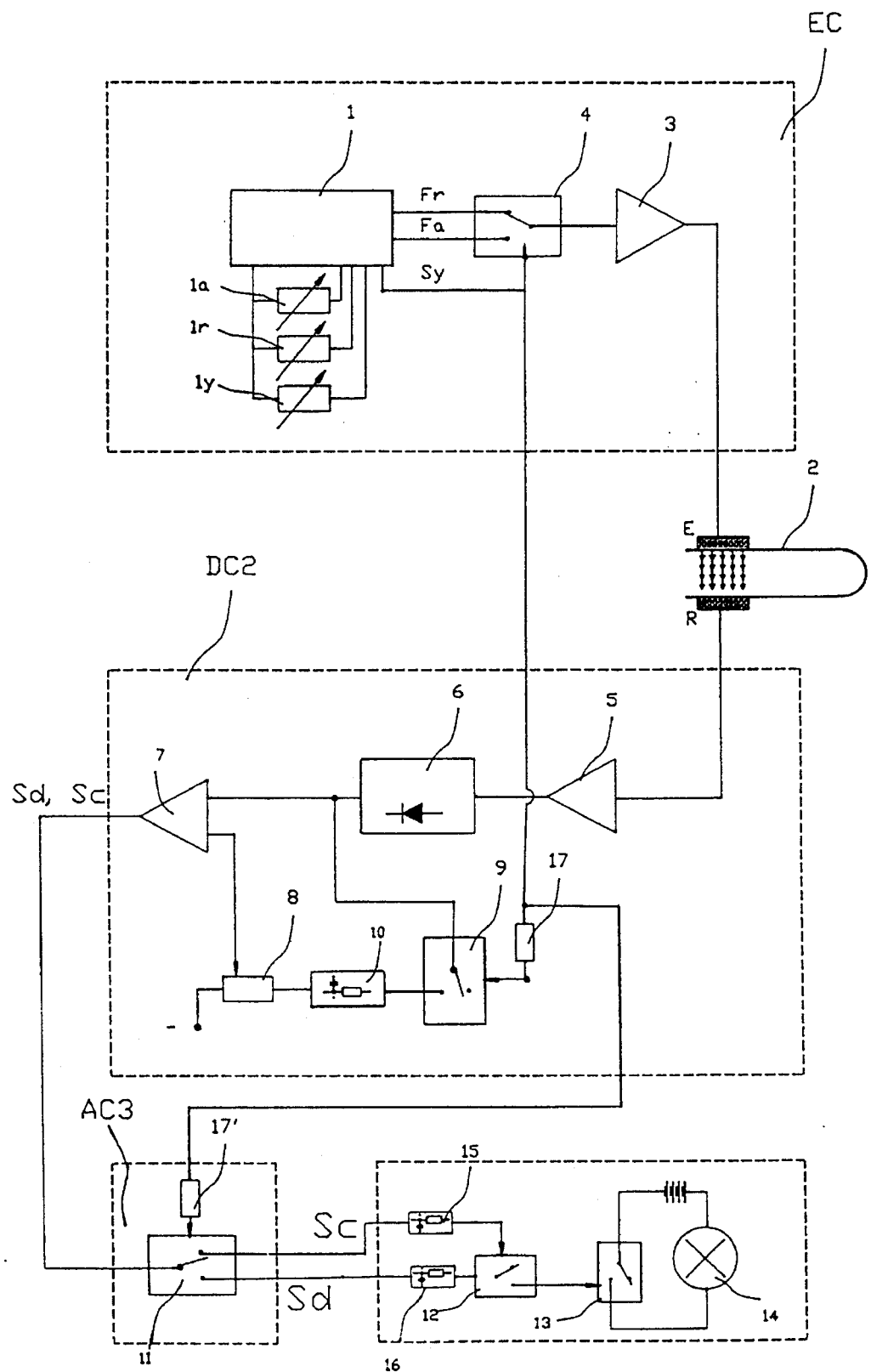
FIG. 3 shows the detector according to FIG. 2 associated with an auxiliary circuit connected to a pump-control circuit.

FIG. 3 shows a detector which corresponds to FIG. 2 and which is here provided with an auxiliary circuit AC3 comprising a switch 11 which comprises an input connected to the output of comparator 7 and two outputs respectively associated with two low-pass filters 15 and 16, is controlled by the synchronizing signal Sy coming from the frequency generator 1 via a retarder 17' and is arranged so as to respectively deliver the control signal So to the output associated with the low-pass filter 15 and the detection signal Sd to the output associated with the low-pass filter 16.

FIG. 3 further shows, by way of example, a pump 14 with an electric supply circuit which is controlled via two switches 12 and 13 shown in their open rest position.

When the detector functions normally, the comparator 7 delivers the control signal Sc which closes the switch 12 and the detection signal Sd passes to the switch 13, which closes in presence of the detection signal Sd to cause the pump 14 to operate.

Absence of the control signal Sc will moreover always stop operation of the pump in case of malfunction of the detector.

Figure 4:
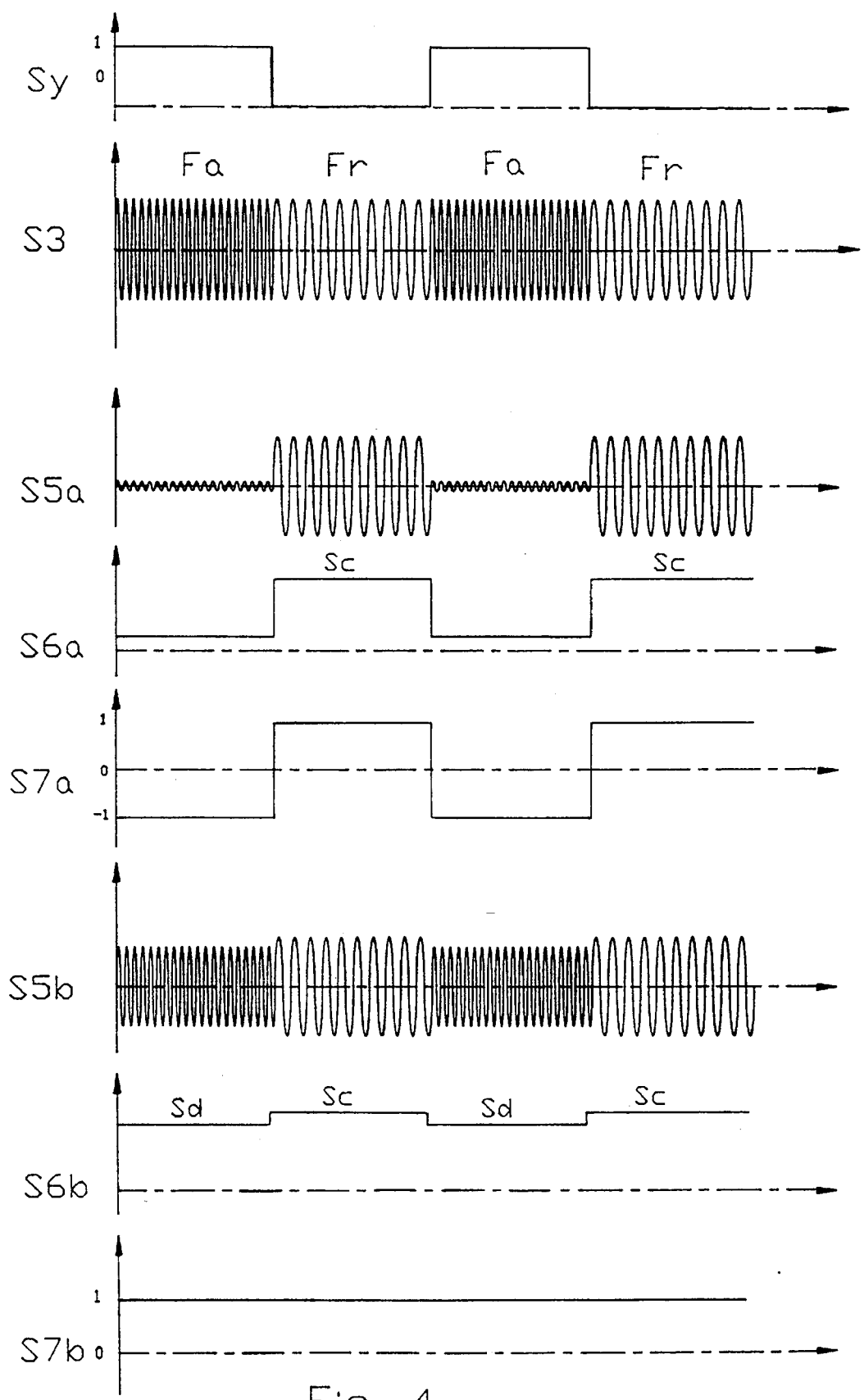
FIG. 4 illustrates the operation of the detector according to FIGS. 1 to 3.

Operation of the detector according to FIGS. 1 to 3 is illustrated in FIG. 4 which respectively represents the following signals:

The synchronizing signal Sy and the corresponding axial-excitation frequency (Fa) and radial-excitation frequency (Fr), transient oscillations not being shown, their relative importance being limited due to the fact that the frequency of signal Sy is chosen so as to be at least 10 to 20 times lower than the radial-excitation frequency Fr.

The response signals S5a, S6a and S7a delivered respectively, in absence of liquid to be detected, by the amplifier 5, the rectifier 6 and the comparator 7 of the detection circuit.

The response signals S5b, S6b and S7b delivered respectively, in presence of the liquid to be detected, by the amplifier 5, the rectifier 6 and the comparator 7 of the detection circuit.

It may moreover be noted that the time lag of the response signals with respect to the transmission signals, resulting from the propagation time between the transmitter and the receiver, is not shown in FIG. 4 in order to simplify the drawing.

As may be seen from FIG. 4, the synchronizing signal Sy corresponds to the values 1 and 0 respectively during the axial-excitation and radial-excitation phases at the axial frequency Fa and the radial frequency Fr.

FIG. 4 further shows that the response signal S5a, S6a in absence of liquid on one hand possesses during the axial-excitation phase (frequency Fa) a low amplitude corresponding to the crosstalk through the common support 2.

The signal S7a delivered by the comparator 7 in absence of liquid to be detected during the axial-excitation phase (frequency Fa) has the value −1 (see FIG. 4).

It may further be seen from FIG. 4 that the response signal S5a, S6a in absence of liquid to be detected has a high amplitude during the radial-excitation phase (frequency Fr), while the corresponding signal S7a delivered by the comparator 7 during this phase has the value +1.

The signal S7a leaving the comparator 7 in absence of liquid thus comprises a periodic control signal Sc, which immediately falls to −1 in case of failure of the detector.

The lower part of FIG. 4 further represents the response signals S5b, S6b and S7b which are respectively delivered in presence of liquid to be detected, by the amplifier 5, the rectifier 6 and the comparator 7 of the detection circuit.

The signal S5b delivered by the amplifier 5 in presence of liquid during the axial-excitation phase (axial frequency Fa) and radial-excitation phase (radial frequency Fr) has a high amplitude during these two phases and the comparator delivers in this case a signal S7b which remains constant at the value 1 so long as the liquid is detected.

On the other hand, if the detector does not work properly for any reason, the signal S7a instantly falls to −1 (both in the presence and absence of the liquid to be detected).

Figure 5:
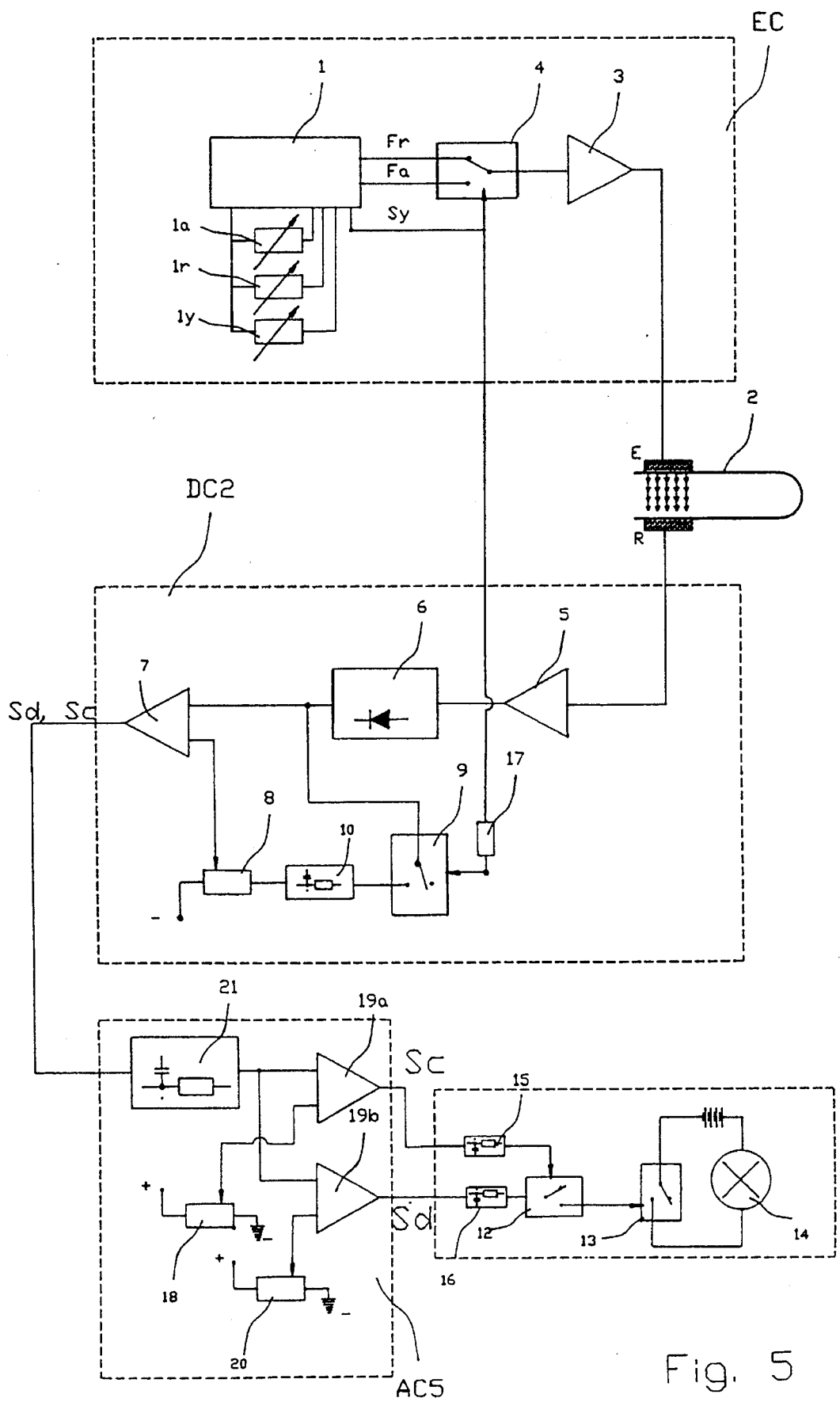
FIG. 5 shows the detector according to FIG. 2 with a variant of the auxiliary circuit connected to the pump-control circuit.

FIG. 5 shows a detector which corresponds to the detector according to FIG. 3 and is provided here with an auxiliary circuit AC5 comprising a rectifier having a low-pass filter 21 with an output connected in parallel with the two other comparators 19a and 19b having threshold-adjustment potentiometers 18 and 20 respectively.

The detection thresholds of these two comparators are adjusted to different values so that the comparator 19b delivers the detection signal Sd at the output associated with the low-pass filter 16 and the comparator 19a delivers the control signal Sc at the other output associated with the low-pass filter 15.

As may further be seen from FIG. 5, this auxiliary circuit AC5 is also associated with the control of a pump 14 in the manner already described with reference to FIG. 3.

Figure 6:
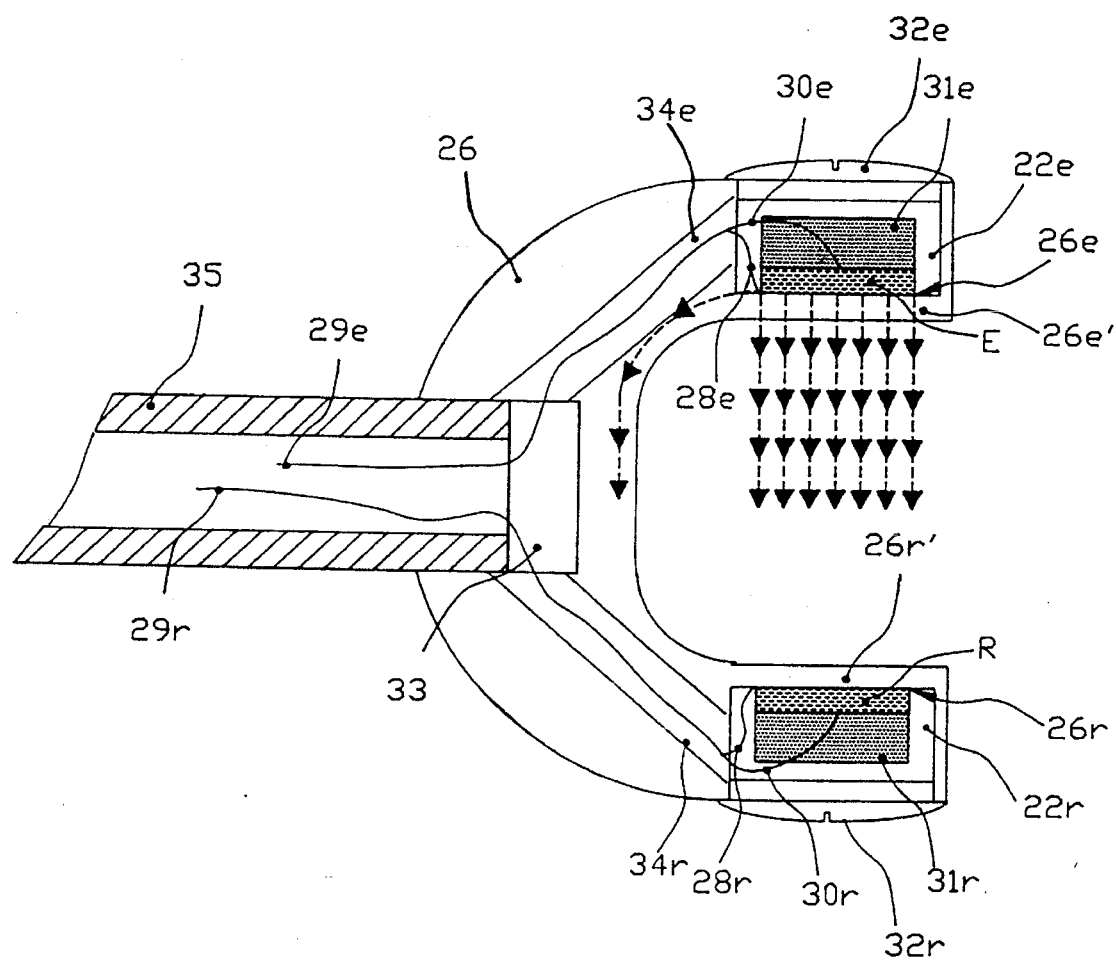
FIG. 6 shows a sectional view of a detector according to another embodiment comprising a U-shaped support.

The detector represented in FIG. 6 comprises the transmitter E and the receiver R mounted facing each other in a common support 26 consisting of a metal section bent in U-form having two diametrically opposite blind holes 22e, 22r recessed in the parallel branches of the support.

These blind holes 22e, 22r are pierced from the exterior while leaving two plane walls 26e', 26r' of small thickness forming an integral part of the support, while their bottoms respectively provide plane bearing surfaces 26e, 26r for mounting the transmitter E and the receiver R.

The two plane walls 26e', 26r' have a very small thickness which is less than 1 mm, in this instance 0.4 mm.

This thickness is advantageously less than one tenth of the wavelength of the ultrasonic waves propagated in the solid material of the support 26, namely in order to render this thin wall 26e' and 26r' transparent to axially transmitted ultrasonic waves.

The manner of mounting the transmitter E will only be described here, given that the assembly of the receiver R is the same.

The transmitter E is seated in the corresponding blind hole 22e while leaving a lateral clearance in order to avoid any lateral contact and crosstalk with the wall surface defining this hole 22e. The principal inner face of the transmitter E is bonded by means of a layer of conductive adhesive to the corresponding bearing surface 26e at the bottom of this hole 22e and is connected to the shield 28e of a coaxial shielded wire 29e.

The outer face of the transmitter E is coated with a layer of this conductive adhesive connected to the central wire 30e of the shielded wire 29e.

A dampening backing 31e is further bonded to the rear face of the transmitter E and the hole 22e is finally closed off by a plug 32e serving to tightly enclose the transmitter E and its electrical connections.

The receiver R is mounted in the blind hole 22r and electrically connected via the shielded wire 29r in identical fashion.

As may be seen from FIG. 6, the U-shaped support 26 is provided with a central hole 33 connected to the blind holes 22e, 22r by two holes 34e, 34r containing the coaxial wires 29e and 29r.

This central hole 33 serves to attach the common support 26 enclosing the transmitter E and the receiver R to a connecting tube 35 containing the electrical connections and serving for connection to the exciting circuit and the detecting circuit (not shown in FIG. 6), while these circuits may be arranged in the same manner as described with reference to the preceding figures.

Figure 7:
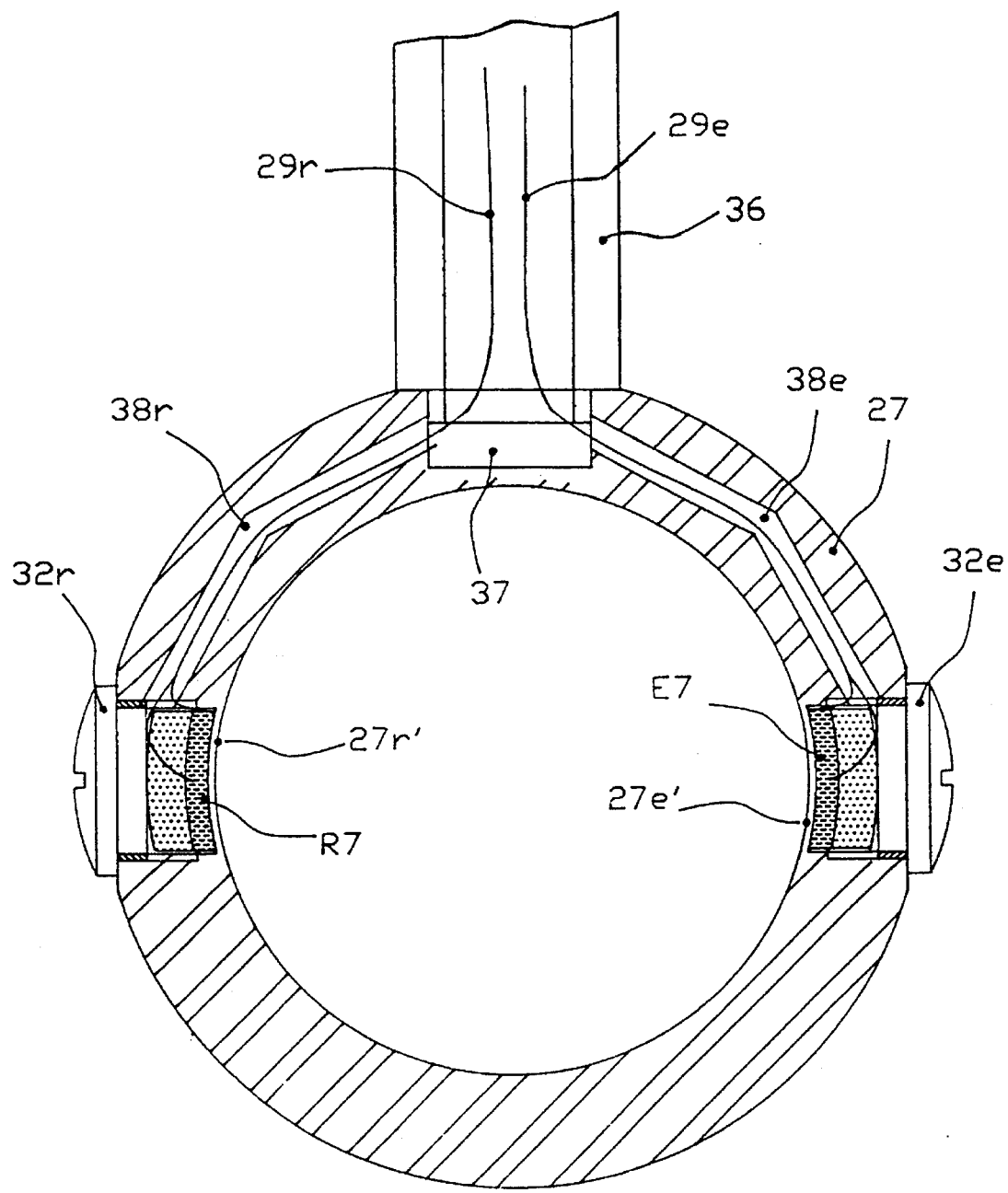
FIG. 7 shows a sectional view of a detector according to another embodiment comprising a support in form of a pipe section.

The embodiment represented in FIG. 7 comprises an annular support 27 in form of a pipe and the assembly of the transmitter E7 and the receiver R7 corresponds to that according to FIG. 6, similar elements already described being designated by the same references in FIGS. 6 and 7.

As appears from FIG. 7, the thin walls 27e' and 27r' presenting the respective bearing surfaces are curved on the periphery of the annular support 27, the transmitter E7 as well as the receiver R7 being curved accordingly so that their principal faces may be adapted to the corresponding bearing surfaces.

A connecting tube 36 is moreover mounted laterally in the central hole 37 on the branch of the annular support which encloses the coaxial wires 29e and 29r respectively in the holes 38e and 38r, in order to conduct these electric wires to the exterior and to connect them to the exciting circuit and the detecting circuit, not shown, while these circuits may likewise be arranged in the same manner as already described with reference to the preceding figures.

This annular detector according to FIG. 7 may be used in different ways. It may be mounted for example on a vertical pipe having the same inner diameter as the annular support 27 in order to detect the presence or absence of liquid at the level of the transmitter E7 and the receiver R7.

The variant according to FIG. 8 comprises modified exciting and detecting circuits EC8 and DC8, which comprise the same elements 1, 1a, 1r, 1y, 2, 3, 5 and 6 as those already described with reference to FIG. 1.

The exciting circuit EC8 comprises a switch 84 with three positions, including a rest position, which is controlled by a logic circuit 80a according to the synchronizing signal Sy.

The detecting circuit DC8 comprises two comparators 87a and 87b having thresholds which are adjustable by variable resistors 88a and 88b and are respectively connected via switches 89a and 89b to monostable reset circuits 811a and 811b which respectively deliver the signals Sc and Sd. The switches 89a and 89b are controlled according to the synchronizing signal Sy coming from the frequency generator 1 respectively via logic circuits 80b and 80c.

The output of the rectifier 6 is connected to the input of the comparators 87a and 87b and to the input of an analog memory 822 which is controlled by the logic circuit 80d according to the synchronizing signal Sy and comprises an output connected to the resistor 88b in order to adjust the threshold of the comparator 87b.

Figure 8:
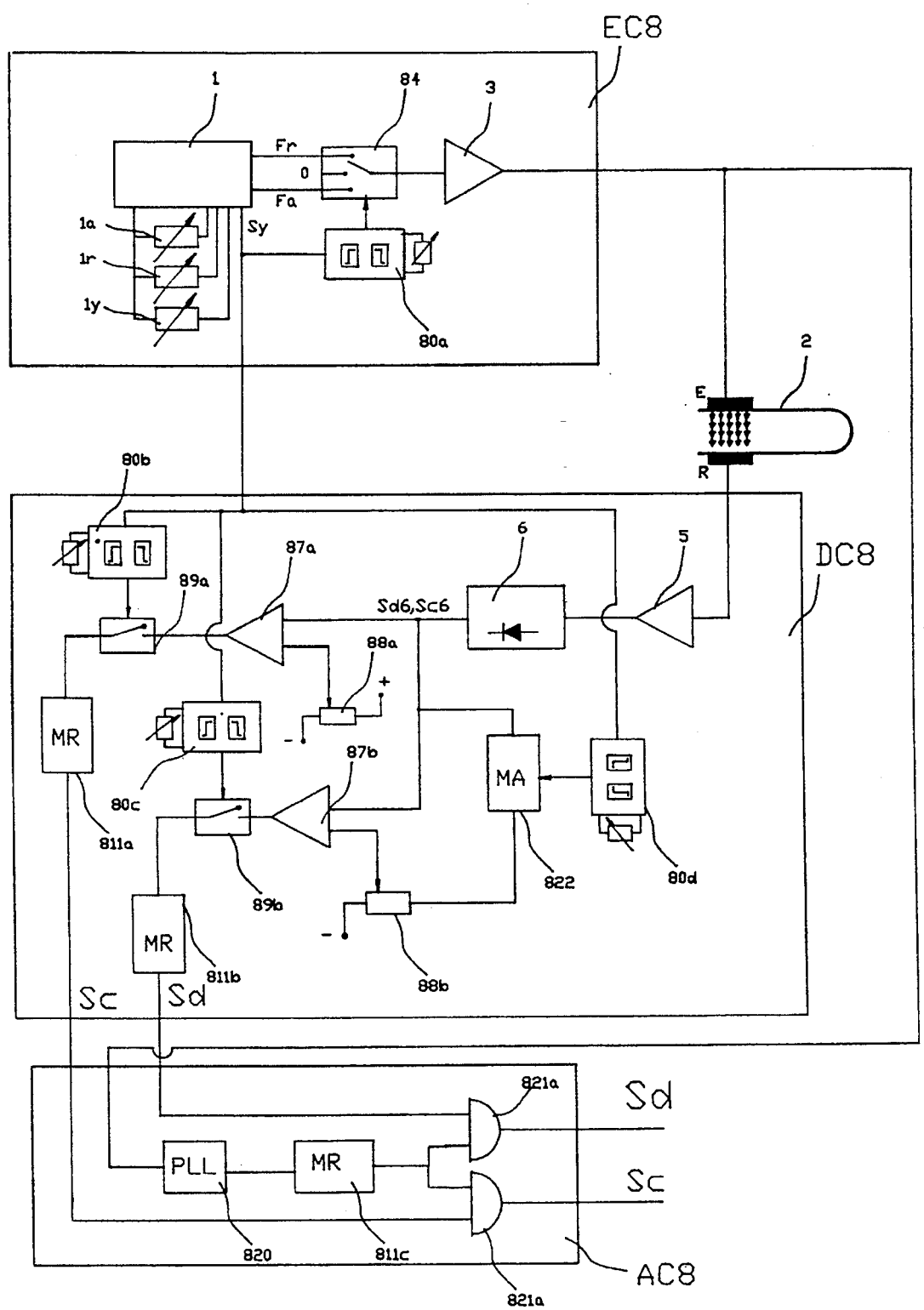
FIG. 8 shows a variant of the-exciting and detecting circuits of the detector according to FIG. 1.

FIG. 8 further shows an auxiliary circuit AC8 for validating the signals Sd and Sc. The output signal of the amplifier 3 is directed to the input of a frequency-discriminating circuit 820 (PLL, phase locked loop).

This circuit 820 is adjusted so that it delivers an output signal 1 if the input signal corresponds to the axial-excitation frequency, and a signal 0 in the opposite case.

The band-width for which this circuit 820 delivers a signal 1 is adjusted according to the piezoelectric transducers E and R and to the admissible signal level when the frequency drifts.

The output of the discriminating circuit 820 thus intermittently delivers, when the circuit operates normally, a signal 1 to the monostable reset circuit 811c which in this case delivers a constant signal 1. This signal is directed to two logic AND gates 821a and 821b. These two gates validate the signals Sd and Sc delivered by the circuit DC8.

The output signal Sd6, Sc6 of the rectifier 6 is directed to the two comparators 87a and 87b having thresholds adjustable by the variable resistors 88a and 88b.

The comparator 87a delivers a signal 1 or 0 according to whether the control threshold is reached or not. The switch 89a controlled by the logic circuit 80b directs the output signal of the comparator 87a to the monostable reset circuit 811a as a function of time. Only the signal corresponding to the reception time of the radial wave is taken into account.

The monostable reset circuit 811a thus excited delivers a continuous control signal Sc so long as the signal coming from the switch 89a passes to 1 and is repeated at a sufficiently high frequency corresponding to the time constant of the monostable reset circuit 811a.

The comparator 87b operates in the same way for the signal Sd6 corresponding to the detection signal. The logic circuit 80c enables the switch 89b to direct the signal received, at time intervals corresponding to the reception time of the axial wave, to the monostable reset circuit 811b which operates in the same way as the monostable reset circuit 811a.

The analog memory 822 receives the output signal Sc6 of the rectifier 6 and, at the instant corresponding to reception of the radial wave, which instant is indicated by the logic circuit 80d, stores this value which is supplied on one side to the threshold-adjusting resistor 88b. The threshold of the comparator 87b is thus adjusted automatically according to the efficiency of the transducers E and R.

Figure 8A:
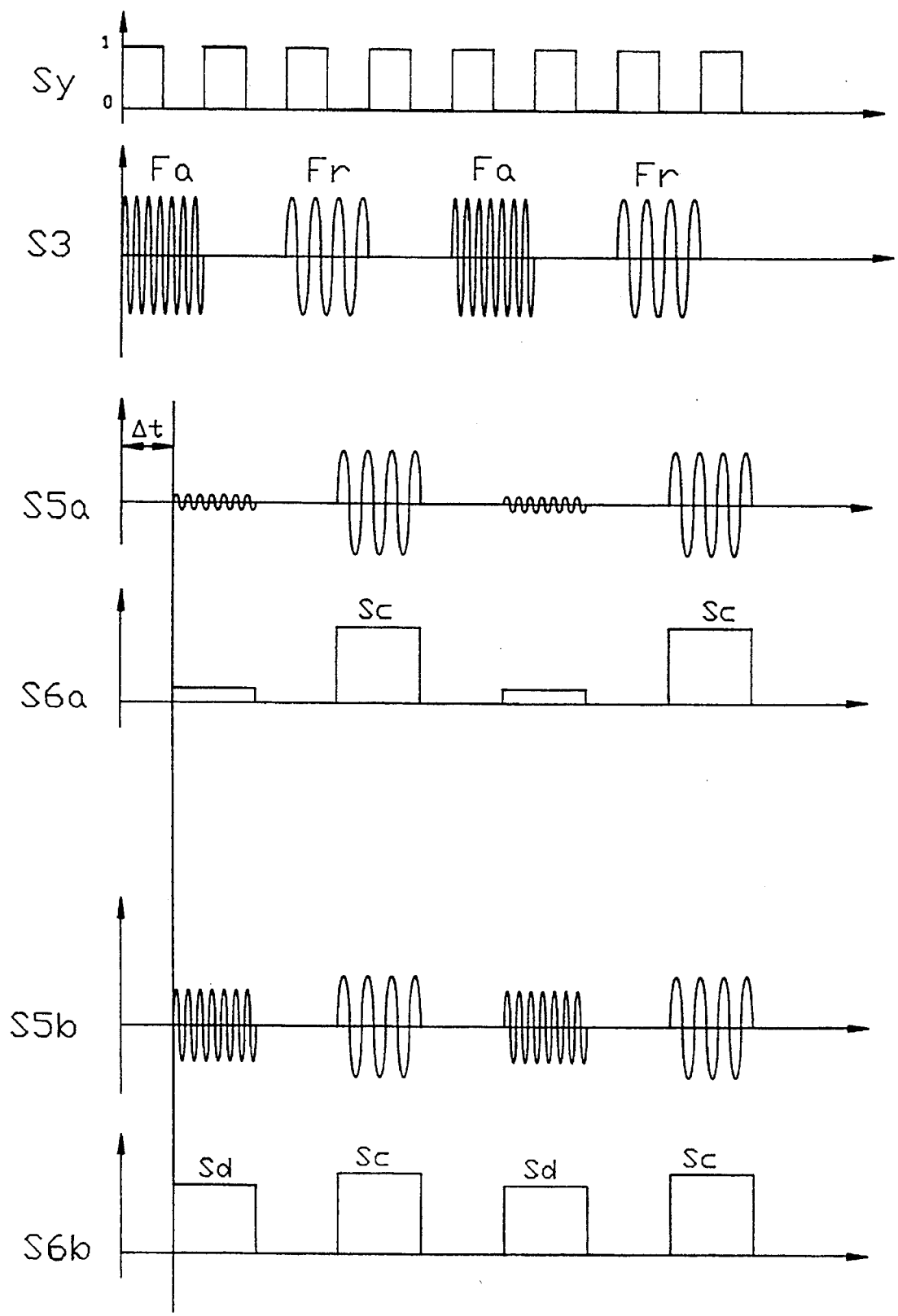
FIG. 8a illustrates the operation of the detector according to FIG. 8.

FIG. 8a illustrates the operation of the circuits according to FIG. 8, the signals S3, S5a, S5b, S6a, S6b corresponding respectively to the signals with the same references and already described with regard to FIG. 4. This figure shows the time lag of the reception period with respect to transmission due to the wave propagation time.

The value coming from the analog memory 822 may moreover also be used as an indicator of the efficiency of the transmission and reception elements and may be taken into account in the validation of the signals.

Figure 11A:
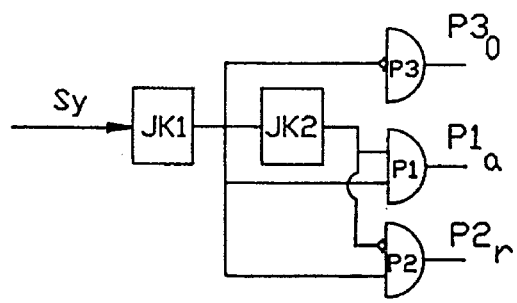
FIGS. 11a, 11b, 11c show embodiments of the logic circuits according to FIG. 8.
Figure 11B:
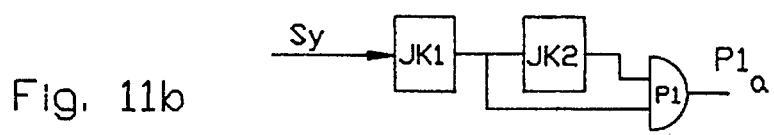
Figure 11C:
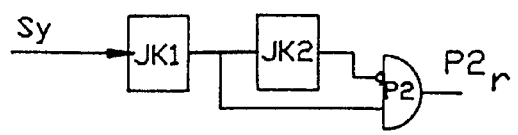

FIGS. 11a, 11b and 11c respectively represent, by way of example, the logic circuits 80a, 80b, 80c, 80d according to FIG. 8.

The logic circuit represented in FIG. 11a comprises two bistable circuits JK1 and JK2 (of the JK type) in series and three gates P1, P2 and P3.

The bistable circuit JK1 receives the synchronizing signal Sy and switches over at the rising flank of this signal. The bistable circuit JK2 switches over at the rising flank of JK1.

The gate P1 delivers the signal $P1_a$ corresponding to the axial-excitation period, gate P2 delivers the signal $P2_r$ corresponding to the radial-excitation period and gate 3 delivers the signal $P3_o$ corresponding to the rest period.

FIG. 11b and 11c represent simplified embodiments with respect to the circuits according to FIG. 11a.

Figure 10:
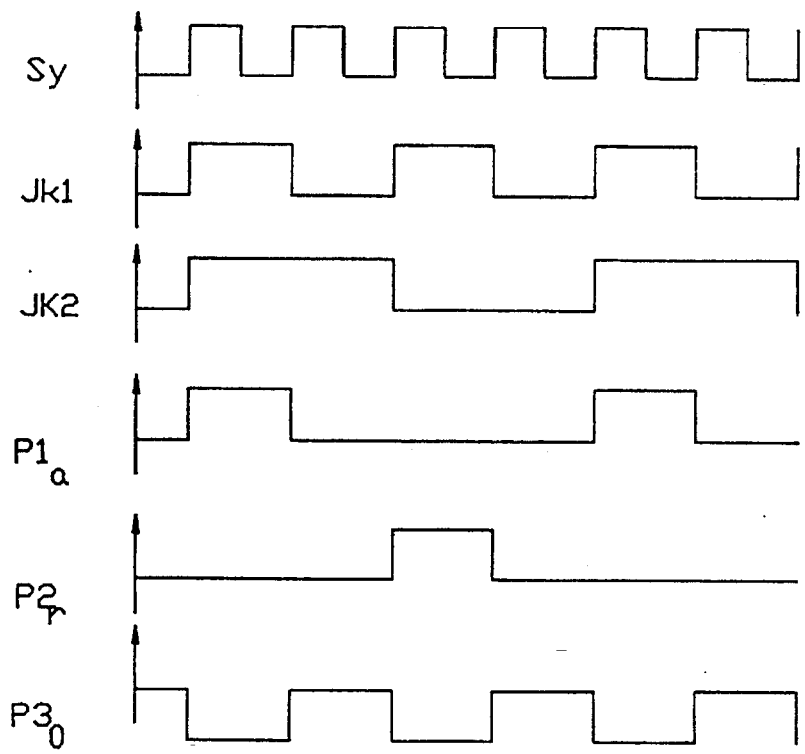
FIG. 10 illustrates the operation of the logic circuits according to FIG. 8.

FIG. 10 illustrates the operation of these logic circuits and represents the sequence of the corresponding signals JK1, JK2, $P1_a$, $P2_r$ and $P3_o$ according to the synchronizing signal Sy.

Figure 9:
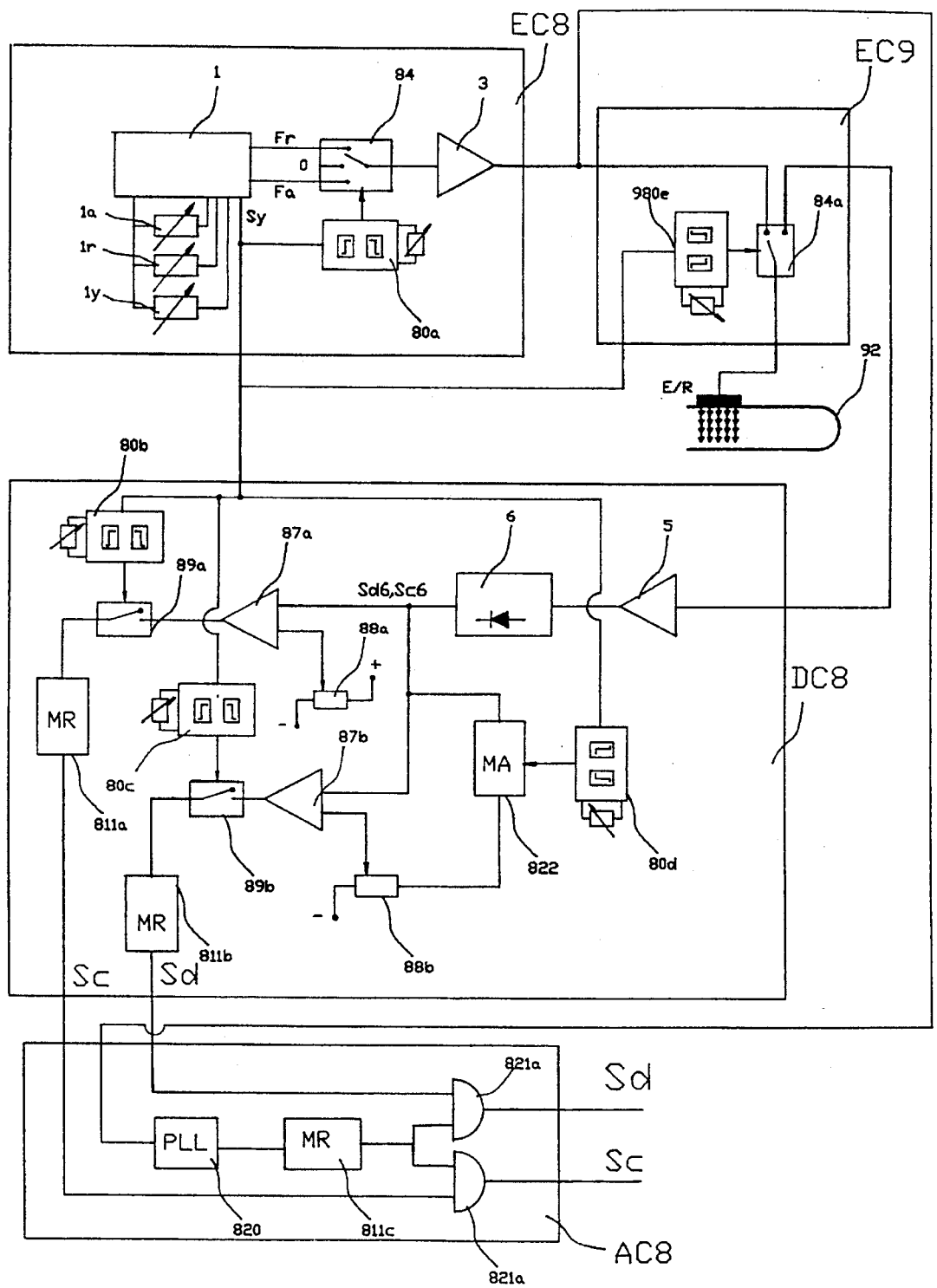
FIG. 9 shows a variant of the detector according to FIG. 8.

FIG. 9 shows a variant of the detector according to FIG. 8, wherein a support 92 is provided with a single piezoelectric element E/R which operates alternately as a transmitter E and a receiver R.

In a first period, said piezoelectric element E/R is connected by the switch 84a to the exciting circuit EC8 so that it operates as a transmitter. At the end of the transmission of a wave train, the switch 84a switches over and connects said piezoelectric element E/R to the detecting circuit PC8 so that it operates as a receiver.

Figure 9A:
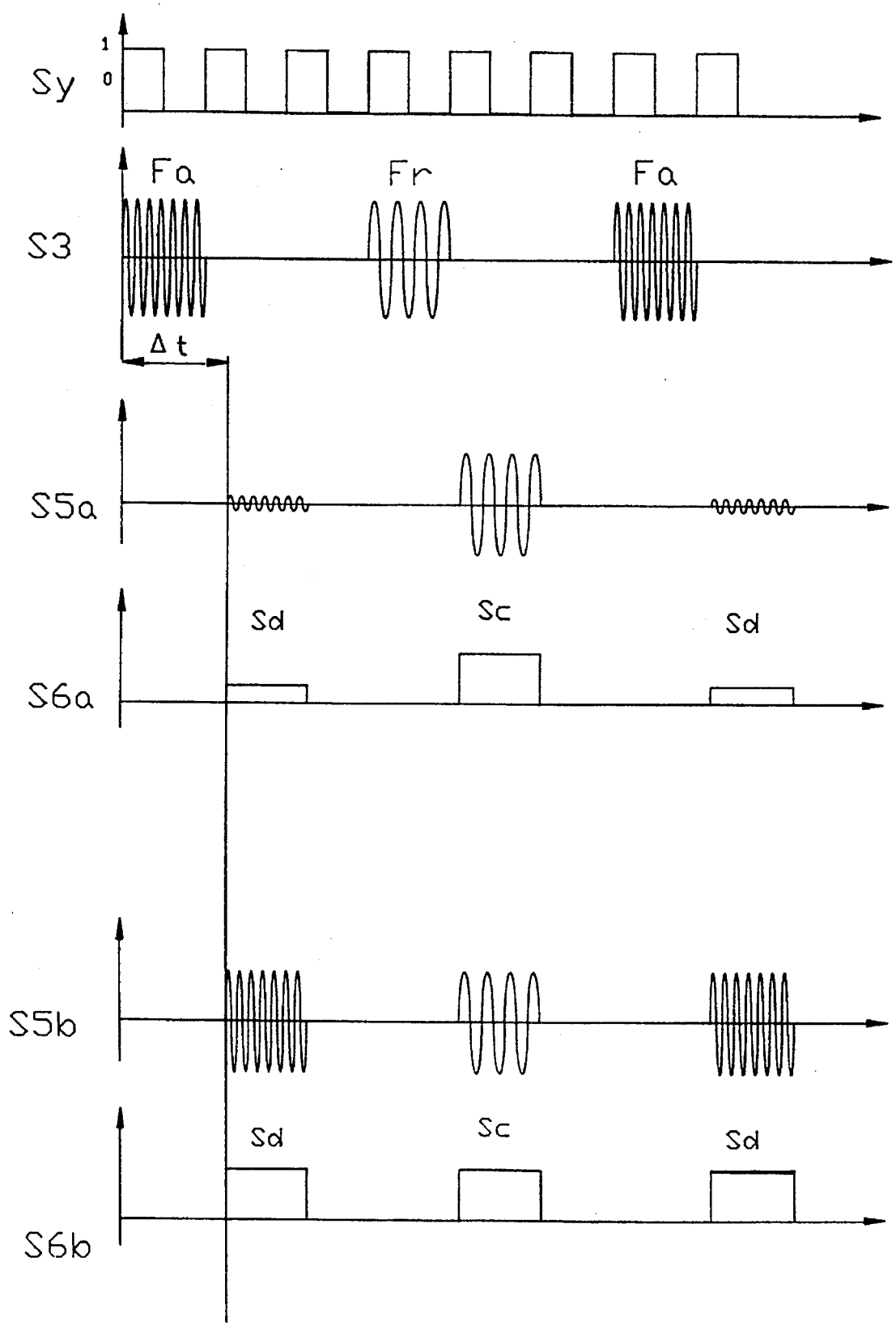
FIG. 9a illustrates the operation of the detector according to FIG. 9.

FIG. 9a illustrates the operation of the circuits according to FIG. 9, the signals S3, S5a, S5b, S6a, S6b corresponding respectively to the signals having the same reference and already described with reference to FIG. 4. This figure further shows the time lag of the reception period with respect to the transmission period due to the wave propagation time going and coming.

The propagation time going and coming back has to be taken into account to determine the length of both the axial and the radial transmission wave trains which must be shorter than said propagation time. The rest period between two axial and radial transmissions must also be longer than the sum of the transmission time and the propagation time going and coming in order to avoid any superposition of signals.

The detector according to the invention offers various practical advantages which allow its use in different fields of application.

Thanks to the automatic control of its working condition, this detector provide very great reliability, as is required for the majority of industrial applications in control and safety systems.

The correction of its detection threshold allows it to be adapted to variable operating conditions.

It thus lends itself to the detection of quite different liquids, which may even be very viscous and corrosive and which may be at a temperature lying between 20° C. and 150° C.

This detector may also serve to detect the appearance of bubbles or porous bodies in a liquid.

What is claimed is:

1. An ultrasonic detector for sensing liquid media including a transmitter and a receiver, said ultrasonic detector comprising:

(a) a transmitter (E) mounted on a support (2), a principal face of a piezoelectric plate forming said transmitter, said transmitter being directly attached to a bearing surface on said support so as to provide a solid mechanical and acoustic connection, thereby establishing acoustic coupling and enabling said principal face to ensure both the transmission of detection waves through said liquid media and the transmission of control waves along a secondary acoustic path within said support, said transmitter being connected to an excitation circuit (EC; EC2; EC8) which is provided with a frequency generator (1) configured to deliver two excitation frequencies (Fa, Fr), said transmitter controlling the operation of said ultrasonic detector by alternately subjecting the transmitter to a high axial resonance frequency (Fa) for the transmission of said detection waves through the liquid medium to be detected and further subjecting said transmitter to a low radial resonance frequency (Fr) for the transmission of said control waves along said secondary acoustic path; and (b) a receiver (R) mounted on said support, said receiver being directly attached to a bearing surface on said support so as to provide a solid mechanical and acoustic connection, thereby establishing acoustic coupling and enabling said receiver to ensure both the reception of said detection waves through a linear acoustic path within said liquid media and the reception of said control waves along the secondary acoustic path within said support, said receiver being connected to a detection circuit (DC1; DC2; DC8) provided with at least one comparator circuit (7; 87a, 87b) configured to deliver a detection signal (Sd) during time intervals when said detection waves are transmitted to said receiver along said linear acoustic path and to further deliver a control signal (Sc) during other time intervals when said control waves are transmitted to said receiver along said secondary acoustic path.

2. The ultrasonic detector as recited in claim 1, wherein said excitation circuit (EC; EC2; EC8) is configured to deliver said two excitation frequencies (Fa, Fr) successively and cyclically to the transmitter (E) so that said detection circuit (DC1; DC2; DC8) delivers said detection signal (Sd) and said control signal (Sc) successively and cyclically.

3. Claim 2, wherein said frequency generator (1) is connected to said transmitter (E) via a switch (4; 84) and is adapted to deliver a synchronizing signal (Sy), said switch being controlled by said synchronizing signal so that said excitation frequencies (Fa and Fr) are delivered alternately to said transmitter.

4. The ultrasonic detector as recited in claim 3, wherein said switch connecting said frequency generator (1) of said excitation circuit (EC8, FIG. 8) to said transmitter (E) comprises a three-way switch (84) controlled via a logic circuit (80a) which receives said synchronizing signal (Sy) from said frequency generator and is configured to control said three-way switch so that said two excitation frequencies (Fa and Fr) are alternately delivered to said transmitter and are separated by intermediate rest intervals.

5. The ultrasonic detector as recited in claim 4, wherein said comparator circuit of said detection circuit (DC2, FIG. 2; FIG. 3; FIG. 5) comprises a comparator (7) which has an adjustable threshold, said comparator being connected to said receiver (R) via an amplifier (5) and a rectifier and low-pass filter (6), said comparator being provided with a variable resistor (8) for adjustment of said threshold as a function of an output signal (SC6) produced by said rectifier and low-pass filter (6), and corresponding to said control signal (SC).

6. The ultrasonic detector as recited in claim 4, wherein said comparator circuit of said detection circuit (DC8, FIG. 8; FIG. 9) comprises a first comparator (87a) having a first adjustable threshold associated with said control signal (Sc) and a first resistor (88a) for adjusting said first threshold, and a second comparator (87b) having a second adjustable threshold associated with said detection signal (Sd) and a second resistor (88b) for adjusting said second threshold, said first and second comparators being connected to said receiver (R) via an amplifier (5) and a rectifier and low-pass filter (6), said second threshold being adjustable as a function of an output signal (Sc6) leaving said rectifier and low-pass filter (6), and corresponding to said control signal (Sc).

7. A method of detecting liquid media by ultrasonic waves generated by a piezoelectric transducer plate mounted on a support defining a linear acoustic path for transmission of ultrasonic detection waves at a high axial resonance frequency through a liquid to be detected, said method including the transmission of ultrasonic control waves at a low radial resonance frequency through said support, said method comprising the steps of:

(a) directly attaching a principal face of said transducer plate to a corresponding bearing surface on said support so as to provide a solid mechanical and acoustic connection thereby to enabling said principal face to ensure both the transmission of said detection waves along said linear acoustic path and the transmission of said control waves along a secondary acoustic path in said support;

(b) connecting said transducer to a frequency generator adapted to deliver said high axial resonance frequency so that said transducer respectively transmits said detection waves and said control waves; and (c) intercepting the ultrasonic detection and control waves respectively transmitted though the liquid to be detected and in said support, and comparing said detection and control waves to at least one threshold in order to effect the detection of said liquid and control of the operation of said transducer.

8. The method as recited in claim 7, further comprising the step of determining any deviation of said control waves with respect to a second predetermined control threshold, and correcting said at least one threshold used for the detection of said liquid media as a function of said deviation.

9. A method of detecting liquid media by ultrasonic waves, said method comprising the steps of:

(a) providing a piezoelectric transducer plate mounted on a support, said transducer plate having a principal face which is directly attached to a corresponding bearing surface on said support so as to provide a solid mechanical and acoustic connection, thereby enabling said principal face to ensure both the transmission of ultrasonic detection waves along a linear acoustic path through said liquid media and the transmission of ultrasonic control waves along a secondary acoustic path in said support;

(b) alternately transmitting said ultrasonic detection and control waves, said detection waves comprising a high axial resonance frequency and being directed through said liquid media to be detected, said transducer plate being connected to a frequency generator configured to produce said high axial resonance frequency, said control waves comprising a low radial resonance frequency and being directed through said support, said frequency generator being further configured to produce said low radial resonance frequency, so that said transducer plate respectively and alternately transmits said detection waves and said control waves; and (c) intercepting the ultrasonic detection and control waves respectively and alternately transmitted though the liquid to be detected along said linear acoustic path and through said support, and comparing said detection and control waves to at least one threshold in order to detect said liquid and to control the operation of said transducer.

10. The method as recited in claim 9, further comprising the steps of determining any deviation of said control waves with respect to a second predetermined control threshold, and correcting said at least one threshold used for the detection of said liquid media as a function of said deviation.

* * * * *